United States Patent
Aklilu et al.

(10) Patent No.: US 8,726,102 B2
(45) Date of Patent: *May 13, 2014

(54) SYSTEM AND METHOD FOR HANDLING SYSTEM FAILURE

(75) Inventors: Ameha Aklilu, Research Triangle Park, NC (US); Hank C H Chung, Taipei (TW); Jeff H C Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/412,037

(22) Filed: Mar. 5, 2012

(65) Prior Publication Data

US 2012/0166873 A1 Jun. 28, 2012

Related U.S. Application Data

(63) Continuation of application No. 13/095,127, filed on Apr. 27, 2011.

(30) Foreign Application Priority Data

Apr. 30, 2010 (TW) ............................... 99113846 A

(51) Int. Cl.
*G06F 11/00* (2006.01)
(52) U.S. Cl.
USPC ........................................................ 714/48
(58) Field of Classification Search
USPC ............................................................ 714/48
See application file for complete search history.

(56) References Cited

U.S. PATENT DOCUMENTS

| | | | |
|---|---|---|---|
| 5,596,711 A | 1/1997 | Burckhartt et al. | |
| 6,505,298 B1 | 1/2003 | Cerbini et al. | |
| 6,587,966 B1 | 7/2003 | Chaiken et al. | |
| 6,963,998 B2 * | 11/2005 | Owhadi | 714/46 |
| 7,010,724 B1 | 3/2006 | Hicok | |
| 7,251,723 B2 * | 7/2007 | Lam | 713/1 |
| 7,426,657 B2 | 9/2008 | Zorek, Sr. et al. | |
| 7,447,934 B2 | 11/2008 | Dasari et al. | |
| 7,484,084 B1 * | 1/2009 | Ranaweera et al. | 713/1 |
| 7,594,144 B2 * | 9/2009 | Brandyberry et al. | 714/43 |
| 2004/0034816 A1 | 2/2004 | Richard | |
| 2005/0240832 A1 * | 10/2005 | Owhadi | 714/46 |
| 2005/0283661 A1 * | 12/2005 | Wong et al. | 714/12 |
| 2007/0088988 A1 * | 4/2007 | Gupta et al. | 714/48 |
| 2008/0126852 A1 * | 5/2008 | Brandyberry et al. | 714/8 |
| 2008/0288764 A1 * | 11/2008 | Lu | 713/2 |
| 2012/0054539 A1 * | 3/2012 | Zhang | 714/6.2 |
| 2012/0278653 A1 * | 11/2012 | Cheng et al. | 714/13 |

FOREIGN PATENT DOCUMENTS

| | | |
|---|---|---|
| TW | 1220705 | 9/2004 |
| TW | 200805056 | 1/2008 |

* cited by examiner

*Primary Examiner* — Joshua P Lottich
(74) *Attorney, Agent, or Firm* — Convergent Law Group LLP

(57) ABSTRACT

A system and a method for handling a system failure are disclosed. The method is adapted for an information handling system having a basic input and output system and a micro-controller. The method includes the following steps: sending, via the micro-controller, a signal; checking, via the micro-controller, whether an acknowledgement is received from the basic input and output system responsive to the signal; and scanning, via the micro-controller, a type of a system failure in response to the acknowledgement being not received.

7 Claims, 3 Drawing Sheets

SYSTEM AND METHOD FOR HANDLING SYSTEM FAILURE

CROSS-REFERENCE TO RELATED APPLICATIONS

This application is a Continuation of application Ser. No. 13/095,127, filed Apr. 27, 2011, which claims the benefit of foreign priority under 35 USC §119, to Taiwan Patent Application 99113846, filed Apr. 30, 2010, both of which are incorporated herein by reference.

FIELD OF THE INVENTION

The present invention relates to a system and a method for handling a system failure, and more particularly, to the system and the method for handling a system failure by means of a micro-controller.

BACKGROUND OF THE INVENTION

Due to rapid development of information and network technology, enterprises nowadays resort to wide use of various servers for providing, handling, storing, and managing various internal or external services or data, such as those related to finances, transactions, e-commerce, corporate branding websites, corporate human resources, R&D recordation, and security control. In general, the aforesaid server system(s) are also known as information handling system(s) ("system(s)" for short hereinafter).

Some (correctable or uncorrectable) system failures inevitably occur in the course of the operation of a large number of the systems, probably because of software program failure or hardware malfunction. It is feasible to trigger a software handling procedure for use with a failure, using a system management interrupt (SMI) built in a chipset of some single-chip or multi-chip processor systems. Failure-induced hung situations of the systems cannot be handled by the systems themselves, but have to be manually restarted by an administrator in order for a normal operation status of the systems to be restored. Also, it is impossible to identify the type of a failed device of the systems accurately.

Hence, it is imperative to provide a system and a method for handling a system failure in a management-friendly and high-performance manner and at low costs.

SUMMARY OF INVENTION

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

According to an embodiment of the present invention, a method for handling a system failure is disclosed. The method is adapted for an information handling system having a basic input and output system and a micro-controller. The method includes the following steps: sending, via the micro-controller, a signal; checking, via the micro-controller, whether an acknowledgement is received from the basic input and output system responsive to the signal; and scanning, via the micro-controller, a type of a system failure in response to the acknowledgement being not received.

According to another embodiment of the present invention, where the information handling system has a chipset coupled between the basic input and output system and the micro-controller, the method further includes: triggering, by the signal, a system management interrupt (SMI) of the chipset; serving, via a system management interrupt (SMI) handling procedure of the basic input and output system, the system management interrupt (SMI); and generating, via the system management interrupt (SMI) handling procedure, the acknowledgement.

According to an embodiment of the present invention, a system for handling a system failure is disclosed. The system includes a basic input and output system and a micro-controller. Particularly, the micro-controller sends a signal, and in response to failing to receive an acknowledgement responsive to the signal from the basic input and output system, the micro-controller scans a type of a system failure.

According to another embodiment of the present invention, the information handling system further has a chipset coupled between the basic input and output system and a micro-controller. Particularly, the signal triggers a system management interrupt (SMI) of the chipset, and a system management interrupt (SMI) handling procedure of the basic input and output system serves the system management interrupt (SMI) and generates the acknowledgement.

BRIEF DESCRIPTION OF THE DRAWINGS

To understand the advantages of the present invention right away, please refer to the specific and definite embodiments as shown in the accompany drawings and described above in detail. Those skilled in the art should understand that the accompany drawings are illustrative of the typical and definite embodiments of the present invention rather than restrictive of the scope of the present invention. The present invention is hereunder described in detail and clearly in conjunction with the drawings as follows.

DETAILED DESCRIPTION OF THE EMBODIMENTS

Figure 1:
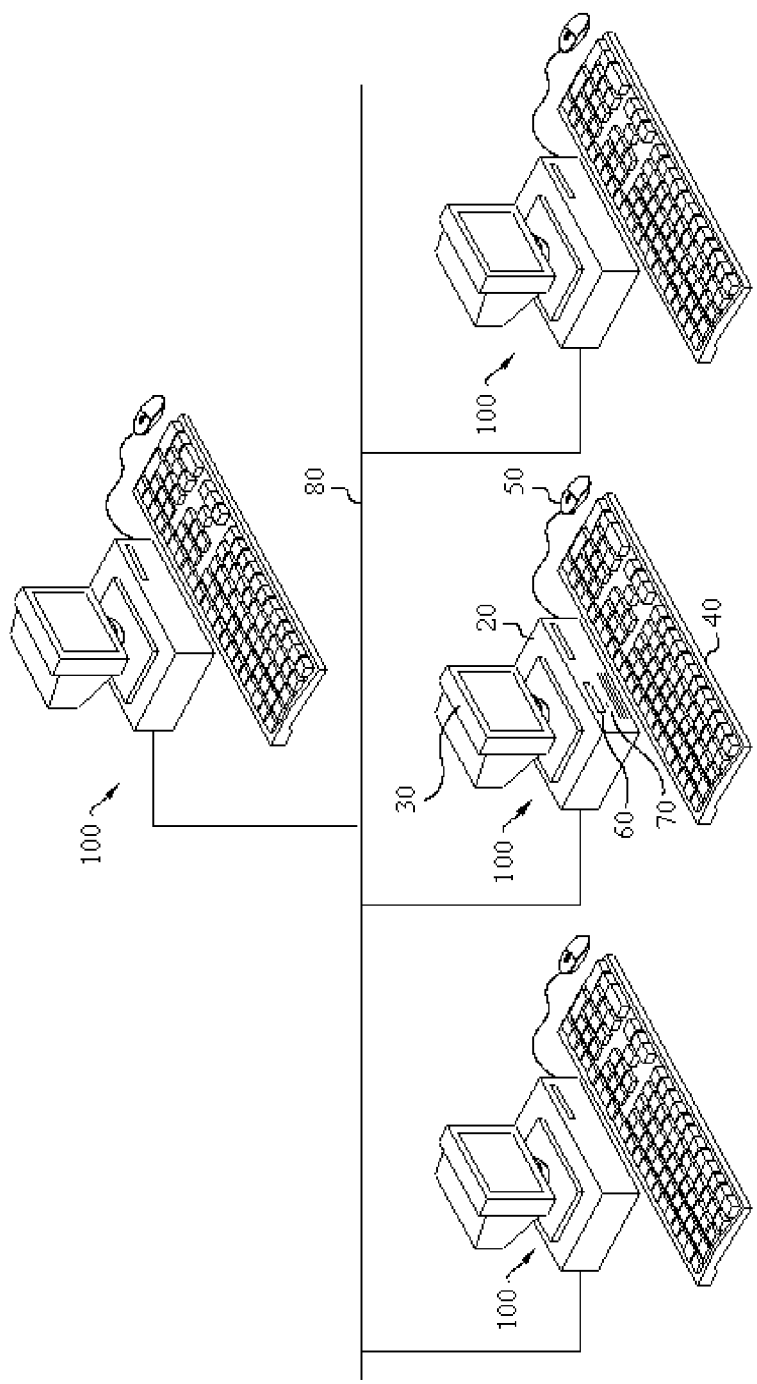
FIG. 1 is a schematic view of a system according to an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The devices, methods, and computer program products are illustrated in the drawings as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 1, there is shown a schematic view of an information handling system 100 according to an embodiment of the present invention. The disclosure in FIG. 1 enables those skilled in the art to gain insight into the present invention rather than imposes a limitation upon the scope of the present invention. As shown in FIG. 1, although four said information handling systems (e.g., servers) 100 are connected with each other through a network 80, the present invention is not limited thereto. For example, other different information handling systems or client terminals may also be connected to the network 80 without affecting the implementation of the present invention. Also, the present invention imposes no limitation upon the quantity of the information handling systems 100. In other embodiments, it is feasible to have a larger or smaller number of the information handling systems 100. In this embodiment, each of the information handling systems 100 comprises a host computer 20, a display device 30 (such as a liquid crystal display), an input device 40 (such as a keyboard), a pointing device 50 (such as a mouse), a storage device 60 (such as a CD-ROM drive, a disk device, or a magnetic tape unit), and an audio device 70 (such as a speaker). Those skilled in the art should understand that, in other embodiments, in addition to the components shown in FIG. 1 for exemplary purpose, the information handling systems 100 can have other components or dispense with some components.

Figure 2:
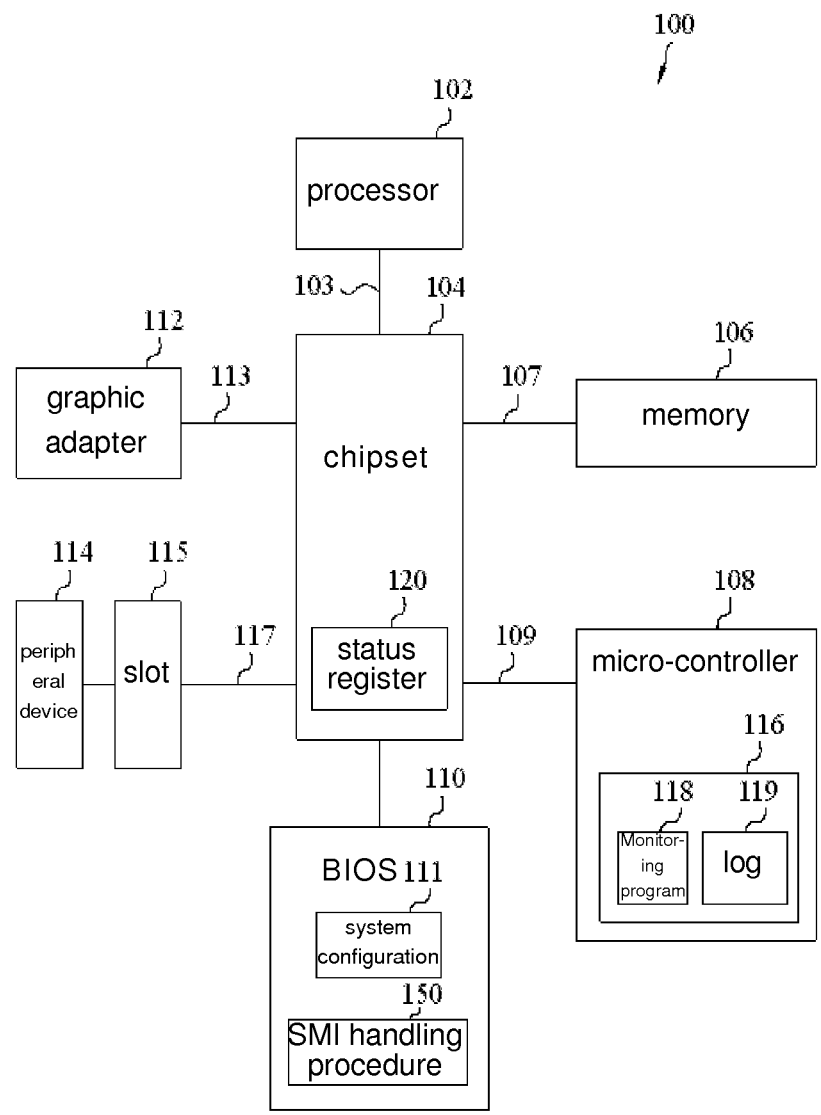
FIG. 2 is a schematic view of an exemplary framework of an information handling system 100.

Referring to FIG. 2, there is shown a schematic view of an exemplary framework of the information handling system 100. As shown in the drawing, the information handling system 100 comprises a processor 102, a chipset 104, a memory 106, a micro-controller 108, a firmware 110, a graphic adapter 112, and a peripheral device 114. In the present invention, the information handling systems 100 execute application programs for providing various information or services, such as Internet-based services (namely instant messages, emails, Internet phone, etc.), multimedia services, or word-processing services, and are exemplified by universal computers, application-specific computers, high-level workstations, large mainframe, etc. In this embodiment, each of the information handling systems 100 is a high-level workstation which has a processor for executing various application programs.

The information handling systems 100 can have one or more processors 102 for executing various application programs and providing various services. The processor 102 is connected to the chipset 104 via a processor bus 103, and the chipset 104 for example includes a "north bridge" chip and a "south bridge" chip; alternatively, the north bridge chip and the south bridge chip are integrated with each other to form a single chip, and thus the aforesaid disclosure does not limit the present invention. For example, in some embodiments, the chipset 104 can further comprise other additional chips, such as wireless communication chips. The north bridge chip usually controls the communication between the processor 102 and other components of the information handling systems. For instance, a memory 106 which is also coupled to the chipset can be, for example, a random access memory (RAM) installed in each of the information handling systems through a memory slot thereof, and data stored in the memory 106 can be accessed by the processor 102 through the chipset 104 and a memory bus 107. In general, a south bridge chip is also connected to a north bridge chip and configured to provide services, for example, operating a power management element or a peripheral component interface (PCI) bus, albeit slower than the north bridge chip does. For example, a south bridge chip is connected, via a PCI bus, to a device installed on a PCI slot. Alternatively, in other embodiments, a south bridge chip is connected to other devices installed on a PCI Express slot or an Industry Standard Architecture (ISA) slot. In this embodiment, the peripheral device 114 commonly named and shown in FIG. 2 can be connected to the chipset 104 through a slot 115 and by connection with a bus 117.

In this embodiment, the chipset 104, which serves an illustrative purpose as far as the disclosure in the present invention is concerned, is an Ibexpeak chipset supplied by Intel Corporation and configured for use with the "Foxhollow platform". In other embodiments, it is also feasible to use other chipsets, such as an ICH10 chipset for use with the "Thurley platform", or any other chipsets supplied by other companies. Intel® is the registered trademark of the Intel Corporation in the United States, other countries, or both. In addition, the peripheral device 114, which serves an illustrative purpose as far as the disclosure in the present invention is concerned, is the Emulex® 10 GbE Server Adapter, NetXtreme® II 1000 Express Ethernet Adapter, or QLogic® iSCSI Single-Port PCIe HBA for use with the System X® Server of IBM. IBM® is the registered trademark of International Business Machines Corporation in the United States, other countries, or both.

In addition to the aforesaid components, the chipset 104 is further connected to the micro-controller 108 so as to enable the information handling system management. The firmware 110 (such as a basic input and output system (BIOS) program stored in a non-volatile random access memory (NVRAM)) enables the information handling systems 100 to perform the most basic input and output operation. The graphic adapter 112, which is connected to the chipset 104 via a graphic bus 113, is installed at a graphic adapter slot, and can be exemplified by an adapter card of an Accelerated Graphics Port (AGP). A point to note is that, in different embodiments, the information handling systems 100 can comprise even more components or even less components. For example, the information handling systems may further comprise a power supply, a Local Area Network (LAN) adapter, a small computer system interface (SCSI) host bus adapter, an audio adapter, a keyboard and mouse adapter, a modem, a wireless transmitter, a hard disk drive (HDD), a magnetic tape unit (MTU), and/or a CD-ROM drive.

The so-called "micro-controller" is a micro-computer having an integrated circuit (IC), wherein a processor, a memory, a timer/counter, and an input and output interface of the micro-computer are integrated into the IC. Compared with a universal processor for use with a personal computer (PC), the micro-controller is more self-contained (i.e., without being connected to any external hardware) and cost-saving. Due to its relatively small volume, the micro-controller is suitable for embedded application; however, the micro-controller is of a small memory capacity and thus can only provide relatively simple functions. In recent years, micro-controllers are in wide use with information handling systems. In general, the micro-controller 108 can function as an interface between system software and hardware. For example, a built-in detector disposed in the information handling systems 100 can report to the micro-controller 108 various detected parameters, such as temperatures, rotational speeds of cooling fans, and/or various voltages, and serve a monitoring function. In this embodiment, the micro-controller 108 communicates with the chipset 104 via a communication interface 109, and the present invention does not impose any limitation upon the major functions provided by the micro-controller 108. As described hereunder in detail, the automatic handling of a system failure, as disclosed in the present invention, can be implemented so as to reduce an administrator's burden, provided that the micro-controller disposed in the information handling systems 100 and connected to the chipset 104 interacts with the chipset 104.

In this embodiment, the exemplary micro-controller is a commercially available micro-controller, such as VSC 452, available from Maxim Integrated Products, Inc. of Sunnyvale, Calif., USA or similar. In other embodiments, it is also feasible to employ any other micro-controller, such as H8S/2461 commercially available from Renesas Electronics Corporation of Tokyo, Japan or any other micro-controllers supplied by any other companies.

A point to note is that, multifunction units disclosed in this specification and the accompanying drawings are depicted as functional blocks or modules, so as to stress in a more definite manner that the multifunction units are independently implemented. For example, the functional blocks or modules can be implemented as hardware circuits, including self-defined VLSI (Very Large Scale Integrated) circuits or gate arrays, such as existing semiconductors, transistors, or other separate components of logic chips. Alternatively, it is feasible to implement, in programmable hardware apparatuses, modules, such as on-site programmable gate arrays, programmable array logic, programmable logic apparatuses, or the like. It is also feasible that modules are implemented by software which is executed by various processors. For example, an identification module of executable code comprises one or more physical or logical blocks of computer instructions. For example, the blocks can be structured as objects, procedures, or functions. However, executable files of the identification module are not necessarily grouped together in a physical manner; instead, they can comprise different instructions stored at different locations. Upon their logical combination, the instructions include modules and serve the specified purposes of the modules.

The executable code module can be a single instruction or a plurality of instructions, and can be distributed among several different program code segments, among different programs, and among several memory devices. Likewise, operation-related data can be identified and described in the modules, embodied in whatever appropriate forms, and structured within a data structure of any appropriate type. Collectable operation-related data is a single data set. Alternatively, operation-related data can be distributed at different locations (including being distributed among different storage apparatuses). Operation-related data may only come in the form of an electronic signal which at least locally exists.

Figure 3:
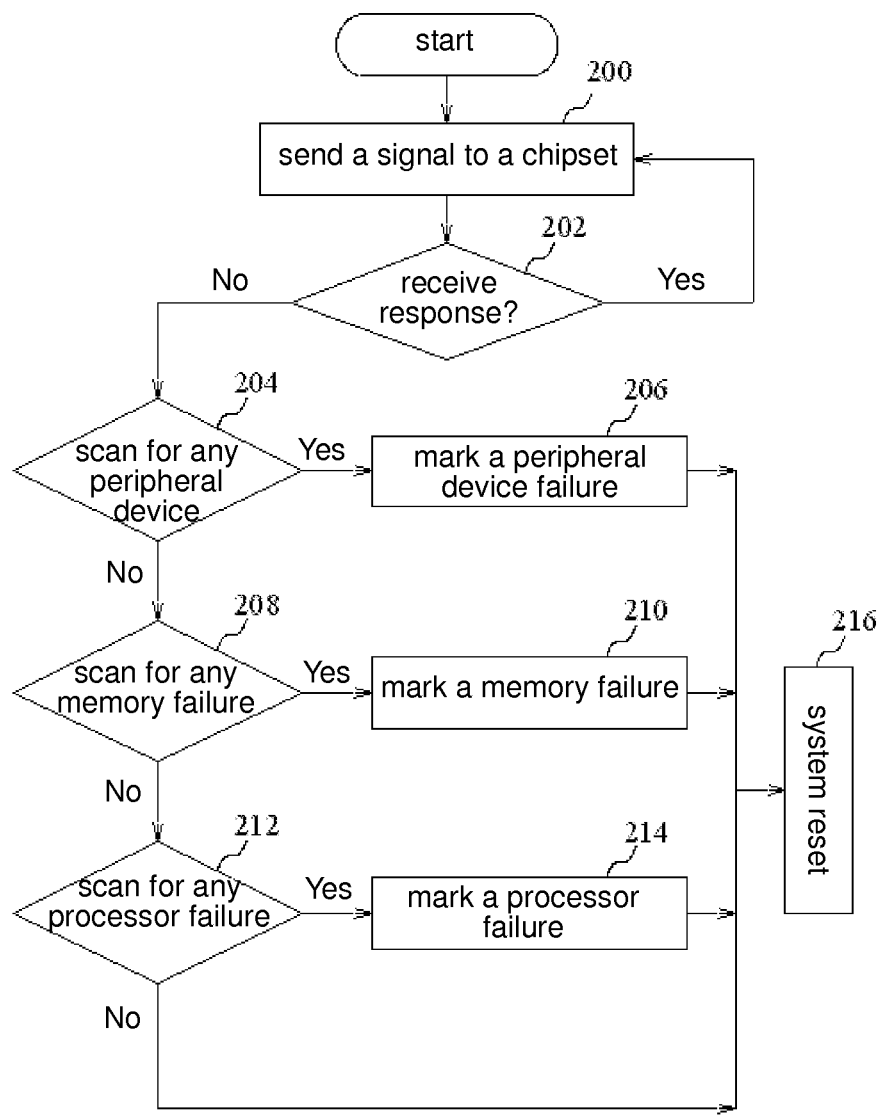
FIG. 3 is a flow chart of a method according to an embodiment of the present invention.

FIG. 3 is a flow chart of a method according to an embodiment of the present invention. In this embodiment, the method starts with step 200. The micro-controller 108 regularly sends a signal to the chipset 104. In general, the micro-controller 108 has certain dedicated pins for handling the control function of the micro-controller 108, and have some other pins for allowing the room for flexible use, such that programmer can provide additional functions. Likewise, the chipset 104 has some pins for allowing the room for flexible use. In this embodiment, the flexibly usable pins (such as GPIO (General Purpose Input Output) pins) of the micro-controller 108 and the flexibly usable pins (such as GPIO pins) of the chipset 104 are connected, so the micro-controller 108 sends a message to the chipset 104 via the communication interface 109, and, in so doing, the functions described herein can be implemented by means of a conventional hardware framework. However, those skilled in the art should understand that, in other embodiments, the present invention can also be implemented by means of the flexible use of other pins of the micro-controller 108 and the chipset 104.

In this embodiment, a signal at GPIO pins triggers a system management interrupt (SMI), and then a corresponding SMI handling procedure (SMI Handler) 150 in a basic input and output system 110 serves the triggered system management interrupt (SMI). The SMI handling procedure 150 sends an acknowledgement to the micro-controller 108. A monitoring program 118 (as shown in FIG. 2) in the micro-controller 108 regularly generates the aforesaid system management interrupt (SMI). The monitoring program 118 is also known as Watchdog Timer. After receiving the acknowledgement, the micro-controller 108 confirms that the information handling systems 100 are in good condition and thus does not take any additional action; hence, the process flow of the method goes back to step 200, thereby allowing a signal to be sent again and anew in the next cycle.

Afterward, in case of a failure of operation of the information handling systems 100, such as a system hardware failure, including, but not limited to, a peripheral device failure, (such as PCI/PCIe errors), a memory failure, and a processor failure (hereinafter collectively referred to as a "system failure"), the information handling systems 100 will crash and thus cannot continue to operate. Conventionally, in case of the system failure, the administrator had to manually restart the information handling systems 100 and confirmed a type of a system failure in an inconvenient manner. In addition, in case of some PCI/PCIe failures, the system would map the failure message to a specific register, such as a status register 120 of the chipset 104 shown in FIG. 2, thus causing the system to generate PERR/SERR and memory failure message concurrently; this type of problems prevented the administrator from identifying the source of failure quickly and accurately.

With the method disclosed in the present invention, the information handling systems 100 can handle the system failure quickly, identify a type of a system failure accurately, take emergency measures promptly, and thus reduce the administrator's burden greatly. In this embodiment, the status register 120 is embedded in the chipset 104 and includes the status register related to a peripheral device failure, the status register related to a memory failure, and the status register related to a processor failure. In other embodiments, the status register 120 can also be disposed outside the chipset 104 and connected to the chipset 104 and/or the micro-controller 108 through a conventional framework, such that the chipset 104 and/or the micro-controller 108 can access data. In another embodiment, a plurality of status register 120 are embedded in or disposed outside the chipset 104, but this feature does not limit the present invention.

Referring to FIG. 3 again, in case of the system failure, the process flow of the method will go to step 204, wherein the micro-controller 108 scans the status register 120 corresponding in position to the peripheral device 114, so as to confirm whether any failure of the peripheral device 114 has occurred, including, but not limited to, a peripheral device failure, a slot failure, and a bridge failure. For example, JTAG (Joint Test Action Group) and/or PECI (Platform Environment Control Interface) can function as an interface for scanning the status register 120 corresponding in position to PCI/PCIe, so as to confirm whether any failure of the peripheral device 114 has occurred. If the micro-controller 108 confirms that a failure of the peripheral device 114 has occurred, the process flow of the method will, in step 206, mark the failure of the peripheral device 114 and store the mark. For example, the record described below is stored in a log 119 of the micro-controller 108.

"Bus Uncorrectable Error" and "Entity ID=PCI"

If no failure of the peripheral device 114 is discovered, the process flow of the method will go to step 208, so as to continue scanning the status register 120 corresponding in position to the memory device 106 to thereby confirm whether a failure of the memory device 106 has occurred. If the micro-controller 108 confirms that a failure of the memory device 106 has occurred, the process flow of the method will, in step 210, mark the failure of the memory device 106 and store the mark. For example, the record described below is stored in a log 119 of the micro-controller 108.

"Bus Uncorrectable Error" and "Entity ID=Memory"

If no failure of the memory device 106 is discovered, the process flow of the method will go to step 212, so as to continue scanning the status register 120 corresponding in position to the processor 102 to thereby confirm whether a failure of the processor 102 has occurred. If the micro-controller 108 confirms that a failure of the processor 102 has occurred, the process flow of the method will, in step 214, mark the failure of the processor 102 and store the mark. For example, the record described below is stored in a log 119 of the micro-controller 108.

"Bus Uncorrectable Error" and "Entity ID=CPU"

After confirming a type of a system failure, the process flow of the method goes to step 216 in which the information handling systems 100 are reset, for example, by restarting the information handling systems 100, so as to prevent the information handling systems 100 from crashing continuously.

According to an embodiment of the present invention, GPIO pins are set to SMI pins, and the micro-controller 108 regularly generates and sends system management interrupt (SMI) to the basic input and output system 110. Then, a system management interrupt (SMI) handling procedure 150 sends an acknowledgement ACK to the micro-controller 108, so as to allow the micro-controller 108 to perceive that the system is still functioning well. The acknowledgement ACK may be a self-defined intelligent platform management interface (IPMI) instruction. If the micro-controller 108 does not receive the acknowledgement ACK from the system management interrupt (SMI) handling procedure 150, it means that the system management interrupt (SMI) handling procedure 150 cannot serve, and indicates that the system is in a crash state; hence, the micro-controller 108 can handle the failure(s) in a way as shown in FIG. 3.

A point to note is that various details described above serve to illustrate the embodiments of the present invention and should not be deemed as limitations of the present invention. In fact, the present invention still should be subject to plenty variations without departing from the scope of the present invention. For example, the monitoring program 118 and the log 119 can be stored in a memory element 116 inside the micro-controller 108, such that the monitoring program 118 and the log 119 can be accessed and/or executed by the micro-controller 108. For example, the memory element 116 is a flash memory, a static random access memory (SRAM), or any other element for storage. However, in other embodiments, the monitoring program 118 and the log 119 are stored in different components, respectively, or are even stored in a storage device disposed outside the micro-controller 108, but this feature does not limit the present invention. In addition, in step 216, before the information handling systems 100 are restarted, the micro-controller 108 can reset the information handling systems 100, and remove the hardware marked as failed from, for example, the system registry, such that the information handling systems 100 will not load the failed hardware again and crash when restarted. For example, if the basic input and output system 110 of the information handling systems 100 reads the log 119 and detects a failed hardware, the basic input and output system 110 will modify the record of a system configuration file 111 and disable the failed hardware, so as to effectuate the adjustment of system configuration. Accordingly, before the administrator begins the maintenance work, the information handling systems 100 can at least automatically recover a portion of related functions, for example, through operating by less memory, or switching from multiple processors to a single processor for operation, or even shutting down a portion of the switches of the apparatuses connected to PCI/PCIe.

The present invention can be implemented in other specific manners without departing from the spirit embodied or essential features disclosed in the present invention. Every aspect of the specific embodiment described herein should be deemed as illustrative rather than restrictive. For example, although the examples given above are exemplified by a crash of the information handling systems 100, the examples should not limit the present invention. For example, in the situation where a minor correctable error occurs to the systems, the method of the present invention should still be applicable, and the contents of the marks are implemented similar to the embodiments as described above. In other embodiments, the micro-controller 108 scans for any hardware failures other than those described above, for example, scanning for a failure of the graphic adapter 112, or scanning for other hardware inside another information handling system 100, and put the marks of failure in the log 119 as described above. In other embodiments, components inside the information handling systems 100 can also be implemented in other ways without affecting the implementation of the present invention. For example, the graphic adapter 112 can be directly integrated into the chipset 104, or the functions of other components can be integrated or separated, without affecting the implementation of the present invention.

The description shown above is only about the preferred embodiments of the present invention and is not intended to limit the scope of the invention. Any equivalent variations or modifications without departing from the spirit disclosed by the present invention should be included in the appended claims.

We claim:

1. A method for handling a system failure in an information handling system comprising a basic input and output system and a micro-controller, said method comprising:
   sending, via said micro-controller, a signal;
   checking, via said micro-controller, whether an acknowledgement is received from said basic input and output system responsive to said signal; and
   scanning, via said micro-controller, for a type of a system failure in response to said acknowledgement being not received.

2. The method of claim 1, wherein said information handling system further comprises a peripheral device, and said scanning step comprises:
   scanning, via said micro-controller, a status register corresponding in position to said peripheral device for a failure of said peripheral device; and
   storing, upon confirmation that a failure has occurred to said peripheral device, said failure of said peripheral device via said micro-controller.

3. The method of claim 1, wherein said information handling system further comprises a memory, and said scanning step comprises:
   scanning, via said micro-controller, a status register corresponding in position to said memory for a failure of said memory; and
   storing, upon confirmation that a failure has occurred to said memory, said failure of said memory via said micro-controller.

4. The method of claim 1, wherein said information handling system further comprises a processor, and said scanning step comprises:
   scanning, via said micro-controller, a status register corresponding in position to said processor for a failure of said processor; and
   storing, upon confirmation that a failure has occurred to said processor, said failure of said processor via said micro-controller.

5. The method of claim 1, further comprising:
- marking, in response to a result of said scanning indicates said type of said system failure, said type via said micro-controller; and
- restarting said information handling system via said micro-controller.

6. The method of claim 1, further comprising:
- marking, in response to a result of said scanning indicates said type of said system failure, said type via said micro-controller; and
- resetting a system configuration file via said basic input and output system according to said type of said mark.

7. The method of claim 1, wherein said information handling system further comprises a chipset coupled between said basic input and output system and said micro-controller, said method further comprising:
- triggering, by said signal, a system management interrupt (SMI) of said chipset;
- serving, via a system management interrupt (SMI) handling procedure of said basic input and output system, said system management interrupt (SMI); and
- generating, via said system management interrupt (SMI) handling procedure, said acknowledgement.

* * * * *